(12) United States Patent
Gajic et al.

(10) Patent No.: US 8,102,634 B2
(45) Date of Patent: Jan. 24, 2012

(54) DIFFERENTIAL PROTECTION METHOD, SYSTEM AND DEVICE

(75) Inventors: Zoran Gajic, Västerås (SE); Bertil Lundqvist, Vasteras (SE)

(73) Assignee: ABB Technology AG (CH)

( * ) Notice: Subject to any disclaimer, the term of this patent is extended or adjusted under 35 U.S.C. 154(b) by 45 days.

(21) Appl. No.: 12/763,795

(22) Filed: Apr. 20, 2010

(65) Prior Publication Data

US 2010/0202092 A1  Aug. 12, 2010

Related U.S. Application Data

(63) Continuation of application No. PCT/EP2007/061476, filed on Oct. 25, 2007.

(51) Int. Cl.
*H02H 3/00* (2006.01)
(52) U.S. Cl. ........................... 361/87; 324/76.11
(58) Field of Classification Search .......... 361/35, 361/36, 59, 64, 66, 68, 87; 324/76.11
See application file for complete search history.

(56) References Cited

U.S. PATENT DOCUMENTS

| | | | |
|---|---|---|---|
| 4,502,086 A * | 2/1985 | Ebisaka | 361/87 |
| 4,530,025 A | 7/1985 | Usui | |
| 6,507,184 B1 * | 1/2003 | Elston | 324/107 |
| 7,279,905 B2 | 10/2007 | Cvorovic | |
| 2006/0198073 A1 | 9/2006 | Cvorovic | |

FOREIGN PATENT DOCUMENTS

| | | |
|---|---|---|
| EP | 1696531 A2 | 8/2006 |
| RU | 2237331 C1 | 9/2004 |
| RU | 55219 U1 | 7/2006 |
| SU | 843085 A1 | 6/1981 |

OTHER PUBLICATIONS

International Search Report and Written Opinion of the International Searching Authority; PCT/EP2007/061476; Jul. 17, 2008; 11 pages.

* cited by examiner

*Primary Examiner* — Stephen W Jackson
*Assistant Examiner* — Terrence Willoughby
(74) *Attorney, Agent, or Firm* — St. Onge Steward Johnston & Reens LLC

(57) ABSTRACT

A differential protection method in a power network for determining type of fault occurring within the power network. The power network includes a protected object having two or more ends, and a current differential protection device and a current transformer are arranged at each end. The method includes the steps obtaining, at a first end of the protected object, measured values from a second end of the protected object; comparing, at the first end, changes in measured values taken at the first end with changes in the measured values obtained from the second end; and determining, upon the step of comparing changes in measured values showing differing results, type of fault occurring within the power network.

15 Claims, 2 Drawing Sheets

DIFFERENTIAL PROTECTION METHOD, SYSTEM AND DEVICE

CROSS-REFERENCE TO RELATED APPLICATIONS

The present application is a continuation of pending International patent application PCT/EP2007/061476 filed on Oct. 25, 2007 which designates the United States and the content of which is incorporated herein by reference.

FIELD OF THE INVENTION

The present invention relates generally to the field of electrical power distribution systems and transmission systems, and in particular to methods for protection and to protection equipment within such systems.

BACKGROUND OF THE INVENTION

An electrical power distribution or transmission system comprises protection systems arranged to protect, monitor and control the functioning of devices forming part of the power system. The protection systems detect, among other things, short-circuits, over-currents and over-voltages in power lines, transformers and other parts of the power distribution system.

Protection equipment is used throughout the electrical power system for providing such protection and control. The protection equipment detects and isolates faults on, for example, transmission and distribution lines by opening circuit breakers, and thereafter restoring power flow after the fault has been eliminated. Alternatively, the protection equipment may be arranged to select an alternative route for the power flow upon detection of a fault.

Current differential protection is a relatively new and reliable method for protection of power networks. It is based on the idea of comparing currents on both sides of a protected zone or a protected unit. A protected unit or zone could be any part of the power network, for example a transmission line, transformer, generator, or a transformer station busbar.

FIG. 1 illustrates schematically the principle of current differential protection. Under normal operating conditions, the sum of all currents $I_1$, $I_2$ entering and leaving a protected unit 1, for example a transmission line, is equal to zero. If there is a fault on the protected unit 1, the summation of currents from the various ends will no longer be equal to zero. Under normal operating conditions secondary currents in current transformers 3a and 3b, connected between the protected unit 1 and current relays 2 and arranged to step-down the primary power system current, are also equal, i.e. $i_1 = i_2$ and no current flows through the current relay 2. If a fault occurs within the protected unit 1 the currents are no longer equal and there is a current flowing through the current relay 2. The differential relay 2 then trips circuit breakers arranged at both ends of the protected unit 1 (not shown). The opened circuit breaker(s) will thereby isolate the faulty protected unit from the rest of the power network.

At present, local measurements are used to determine if the current transformer circuits are functioning. FIG. 2 illustrates a protected transmission line L. Common practice is to use two main protection devices for protection, for example current differential protection equipment 4 and distance protection equipment 5. In order to detect faults, the current differential protection equipment 4 utilizes measured values from its current transformer CT1 and also a reference value from a current transformer CT2 of the other main protection device 5. That is, measurement values from the local current transformers CT1 and CT2 are used, which requires the mixing of circuits of the two protection equipment 4 and 5. A drawback with this solution is that it is difficult to determine whether a detected fault originates in the actual protection equipment or in the reference protection equipment.

Further, it can be difficult to determine whether a fault that has occurred is a primary network fault or a secondary network fault. If a secondary fault has occurred, for example faults occurring within the current transformer circuits, it is most undesirable to trip a circuit breaker so that primary transmission lines are taken out of service unnecessarily, thereby interrupting supply of electric power to power users.

In view of the above, it would be desirable to provide an improved method for providing differential protection. In particular, it would be desirable to provide a method for providing differential protection supervision of current transformer circuits. Further, it would also be desirable to provide a corresponding differential protection system.

SUMMARY OF THE INVENTION

It is an object of the present invention to provide an improved method for power network protection overcoming or at least alleviating the above-mentioned drawbacks of the prior art. In particular, it is an object of the invention to provide a method for differential protection, wherein a fault within a protection system, in particular the current transformer circuits, can easily and reliably be determined.

It is another object of the invention to provide an improved method for differential protection wherein faults within the protective device current transformers can be detected independently of current transformers of other protection equipment.

It is yet another object of the invention to provide a method for differential protection wherein primary faults can be reliably distinguished from secondary faults.

These objects, among others, are achieved by methods and systems as claimed in the independent claims.

In accordance with the invention a differential protection method for determining type of fault occurring within a power network is provided. The power network comprises a protected object having two or more ends, and a current differential protection device is arranged at each end. The method comprises the steps: obtaining, in the current differential protection device arranged at a first end of the protected object, measured values from the current differential protection device arranged at a second end of the protected object; comparing, in the current differential protection device at the first end, changes in measured values taken at the first end with changes in the measured values obtained from the second end; and determining, upon the step of comparing changes in measured values showing differing results, type of fault occurring within the power network. In accordance with the invention, since measured values are obtained from a second end of the protected object, a fault within a current transformer circuit of a current differential protection device can be determined independently of other local protection equipment. Thereby undesirable mixing of circuits of two different protection systems can be avoided and faults occurring within the actual protection device can be reliably determined. Further, by means of the invention changes in measured values are compared and type of fault is determined based thereupon. Thereby unnecessary tripping of primary transmission lines is avoided as a primary fault can reliably be differentiated from a secondary fault in the current circuits. Further yet, in accordance with the invention an increased security is provided in that tripping commands are issued only when needed. However, the increased security is not provided at the expense of lowered dependability of the system. That is, the dependability of the protected power network is maintained and if a fault occurs within the power network a tripping command is reliably issued. The invention thus provides both an increased security as well as an increased dependability.

In accordance with an embodiment of the invention, the step of determining type of fault comprises determining occurrence of a primary fault if the step of comparing changes in measured values shows changes at two or more ends. If the step of comparing changes in measured values shows changes at only one end, then a secondary fault is detected. A reliable method for detecting and determining type of fault is thus provided.

In accordance with another embodiment of the invention, the method comprises the further step of tripping a circuit breaker, in response to the step of comparing measured values showing a change in measured values at two or more ends, i.e. a primary fault. The method may also comprise the further step of blocking a tripping command if the step of determining shows a change in measured values at only one end, i.e. a secondary fault. Unnecessary tripping of primary transmission lines is thus avoided.

In another aspect of the invention, a differential protection system is provided, whereby advantages similar to the above are achieved.

Further embodiments of the invention are defined in the dependent claims. Further embodiments and advantages thereof will become clear upon reading the following detailed description together with the drawings.

DETAILED DESCRIPTION OF THE INVENTION

Figure 1:
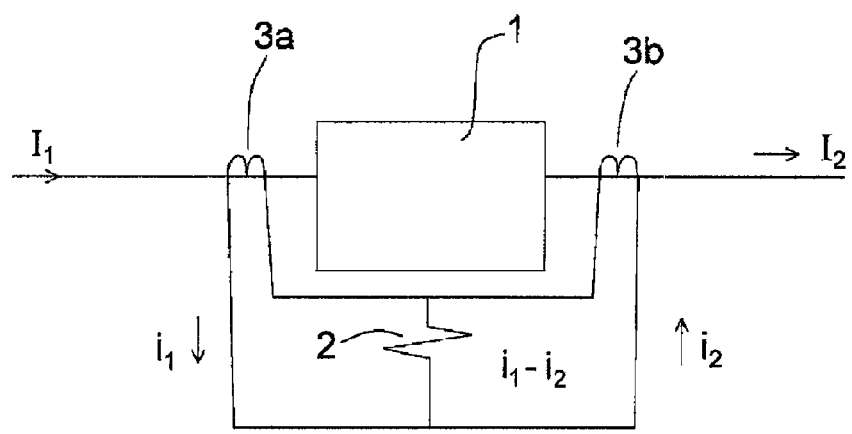
FIG. 1 illustrates schematically current differential protection principle.
Figure 2:
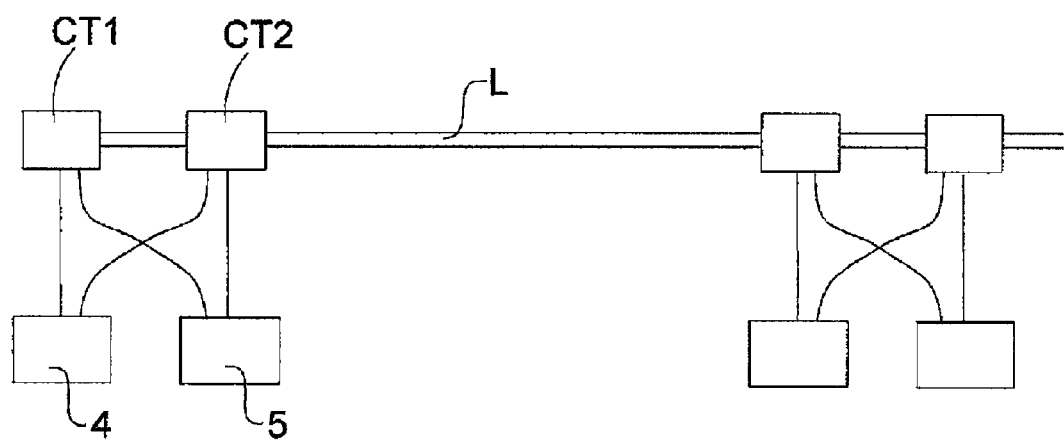
FIG. 2 illustrates schematically a known differential protection system of a transmission line.

FIGS. 1 and 2 have already been discussed in connection with prior art and will not be explained further.

Figure 3:
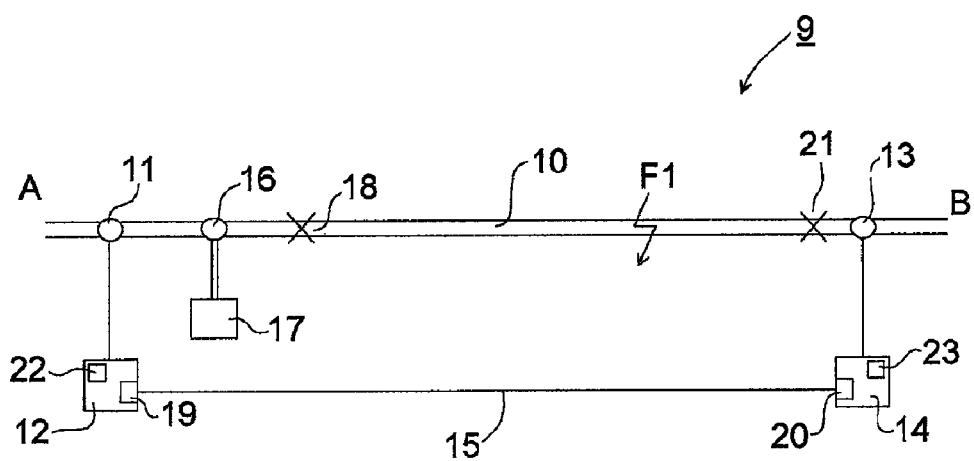
FIG. 3 illustrates schematically a power network in which the present invention may be implemented.

FIG. 3 illustrates schematically an embodiment of the present invention, and in particular a power network 9. A differential protection method in accordance with the invention protects a network object, which network object in the illustrated example is a transmission line 10. The current differential protection method is implemented by means of, for example, suitable computer hardware and other equipment, and in the following description a current differential protection device 12 is used as an illustration of means for executing the inventive method.

The current differential protection device 12 is connected to the transmission line 10 via a current transformer 11. The current differential protection device 12 is arranged at a first end, denoted A, of the transmission line 10. The current transformer 11 is, in a known manner, arranged to step-down the current to a level suitable for handling by the current differential protection device 12. At the opposite end, denoted B, of the transmission line 10 a corresponding current differential protection device 14 is arranged, together with a corresponding current transformer 13. The distance between the two current differential protection devices 12, 14 could, for example, be from a few up to hundreds of kilometers.

The current differential protection devices 12, 14 comprise communication means 19 and 20, respectively, by means of which two or more communication channels 15 can be established between the current differential protection devices 12 and 14. The communication means preferably comprises digital communication means, by means of which numerical measurement values can be exchanged between different ends of a protected device. The communication channel 15 could be fibre-optical communication channel, that is, the current differential protection devices 12 and 14 are connected by means of an optical fibre 15. The communication means 19, 20 of the current differential protection devices 12, 14 could then for example comprise fibre-optical terminal means. There should be two (or more) communication channels 15, one in each direction, i.e. duplex communication.

The communication channels 15 are used for sending measured values and other data between the current differential protection devices 12, 14. Thereby, no local reference measurements need to be used in accordance with the invention. Consequently, mixing of the circuits of the local protection devices can thereby be avoided. A second protection device 16, 17 arranged at the first end A of the transmission line 10 is thus completely independent of the current differential protection device 11, 12.

The current differential protection devices 12, 14 measure currents and other data. In accordance with the invention, the current differential protection device 12 at the first end A of the transmission line 10 is arranged to compare its measurements with reference data obtained from the current differential protection device 14 at the second end B of the transmission line 10 in order to determine whether a fault has occurred.

Current values at the transmission line 10 end A are compared with current values at transmission line 10 end B. Under normal operating conditions, the current is equal at both transmission line ends A and B.

In order to perform the above measurements and comparisons, the current differential protection devices 12, 14 comprise processing means 22, 23 suitable to this end. The different ends should have the same logic circuits, and all ends should also have the reverse logic.

By comparing current values, or other measuring values, from both ends (or several ends) with each other, the type of fault can be determined. An advantage of the present invention is that continuous, numerical values are used, which is more accurate than, for example, comparing measurement values to set threshold values. If there is no change in current in the actual protection device, but a change in current in the other end, no trip will be issued by the local end, only a remote current transformer alarm.

In an embodiment of the invention, the current at one end is measured and compared to an earlier current value at that end, di/dt. The corresponding calculations are made at the other end(s). The values at one end are compared to corresponding values at the other end(s), which corresponding values are obtained by means of the communication channel 15. For example, a measured value at one end A could be compared to a value obtained one or two power system cycles before at that end A, e.g. 20 to 40 ms before in a 50 Hz power system. If there is a current change only in one end, for example at transmission line end A, but not in the other end, for example end B, then it can be concluded that the current change is caused by a secondary fault, for example caused by a current transformer 11 circuit failure such as a short-circuit or an open circuit.

The above can be summarized in the following Boolean expression, wherein A and B are the respective ends of the transmission line $L_1$, i is sampled instantaneous current values, preferably time tagged with synchronous clocks at both ends and $L_1$ is transmission line L of phase 1:

if $i(L_1A)=i(L_1B)$ then no faults
if $i(L_1A)>i(L_1B)$ AND
$i(L_1A)$ unchanged AND
$i(L_1B)$ changed
then block trip command from transmission line end A.

That is, the fault is not a primary fault, but a secondary fault at end B.

For transmission end B, corresponding expressions are:
if $i(L_1A)=i(L_1B)$ then no faults
if $i(L_1B)>i(L_1A)$ AND
$i(L_1B)$ unchanged AND
$i(L_1A)$ changed
then block trip command from B, i.e. not a primary fault.

That is, the fault is not a primary fault, but a secondary fault at end A.

By a changed current value at one of the transmission line ends A, B is meant a change compared to a previous measurement, for example a value a few milliseconds earlier, as described earlier.

The above conditions can of course be implemented for a typical three-phase power system, having three separate phase currents.

A person skilled in the art, having read the present application, is able to construct logic for implementing the present idea, which is exemplary illustrated by the above algorithms.

If there is a primary fault, indicated in the FIG. 3 at F1, there is a change in current at both ends A, B of the transmission line 10. In response to detecting a primary fault, the current differential protection device 12 issues a trip command for tripping a circuit breaker 18. If there is a secondary fault, for example in the current transformer circuits, then there is a current change only at the end at which the fault occurs. The opposite end does not have any current changes. By means of the invention, primary faults can thus reliably be distinguished from secondary faults in the current circuits. Further, the transmission line 10 is not unnecessarily disconnected.

Figure 4:
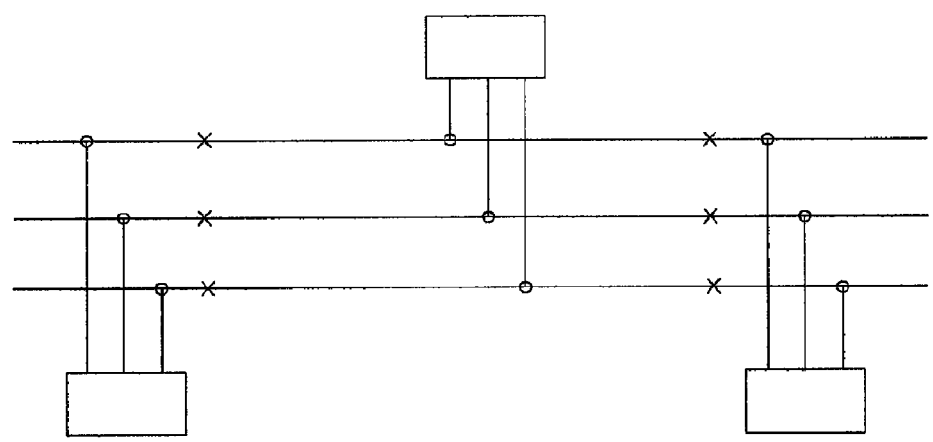
FIG. 4 illustrates schematically another power network in which the present invention may be implemented.

In FIG. 4 a three-ended three-phased power network is illustrated. The present invention can be implemented in such multi-ended systems as well, having three or more ends. The different ends of the transmission system are interconnected by means of a suitable communication means. Data can thereby be exchanged between all ends of the transmission system. If there is a primary fault, this fault will be detected by detecting two simultaneous changes at two of the transmission line ends; for example in a three-ended power system, if there is current changes at two of the transmission line ends then it can be established that there is a primary fault, and a tripping command should be issued. A secondary fault is detected only when there is a currents change in one end only, regardless of the number of line ends.

Figure 5:
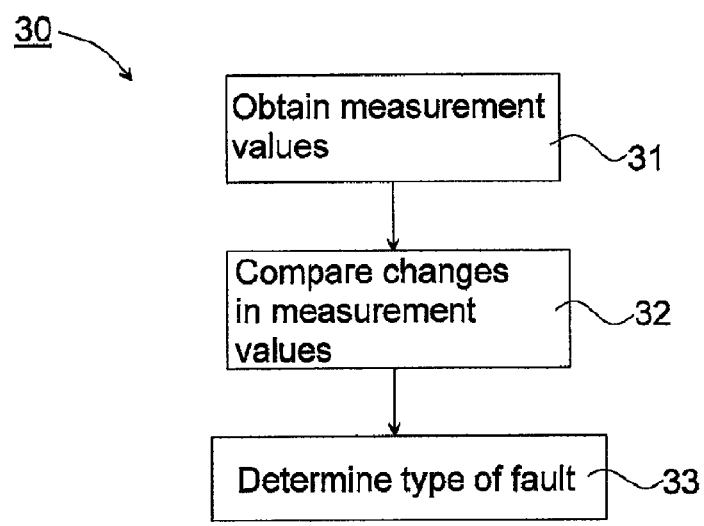
FIG. 5 illustrates a flow chart over steps of a method in accordance with the present invention.

FIG. 5 illustrates steps of a differential protection method 30 in accordance with the invention. The method is usable for example within a power network 9, as shown in FIG. 3, and provides means for determining type of fault occurring within the power network 9. The power network 9 comprises a protected object 10, for example a transmission line, having two or more ends A, B. Current differential protection devices 12, 14 and preferably also corresponding current transformers 11, 13 are arranged at each end A, B. In step 31, measured values are obtained in the current differential protection device 12 arranged at the first end A of the protected object 10 from the current differential protection device 14 arranged at a second end B of the protected object 10. These values are communicated by means of the communication channel 15. Next, in step 32, changes of the values from the measurement obtained from the current differential protection device 14 at the second end B are compared, in the current differential protection device 12 at the first end A, with changes in measured values taken at the first end A. In step 33, type of fault occurring within the power network 9 is determined, if step 32 of comparing changes in measured values shows differing results. The step of determining 33 type of fault comprises determining occurrence of a primary fault if the step of comparing 32 changes in measured values shows changes at two or more ends A, B. If the step of comparing 32 shows changes in measured values at only one end, then it is determined that the type of fault is a secondary fault, most likely in the current transformer circuits, and appropriate action is taken.

In a preferred embodiment, the step of comparing changes in measured valued comprises comparing, at the first end A, changes in synchronized time tagged measured values taken at the first end A with changes in the measured values obtained from the second end B, which are time tagged measured values synchronized to the same clock as the measured values at the first end A. Values that are indeed comparable are thus obtained.

The method 30 may comprise further steps, not illustrated in the figure. For example, the method preferably comprises the further step of tripping 34 a circuit breaker 18, 21 in response to the step of comparing 32 showing a change in measured values at two or more ends A, B.

The method 30 could comprise the further step of blocking a tripping command if the step of determining 33 shows a change in measured values at only one end, i.e. if it is a secondary fault.

In the above description a transmission line 10 has been used to illustrate an object or network element that can be protected by means of the present invention. However, it is to be noted that other types of network elements can be protected by means of the present invention, for example transformers, substations, generators, busbars etc.

In summary, the present invention provides an improved method for current differential protection. Current circuits within a protection system can be reliably supervised. Faults within circuitry of the current transformers can be detected independently of current transformers connected to other protection equipment.

The invention claimed is:

1. A differential protection method within a power network for determining type of fault occurring within said power network, said power network comprising a protected object having two or more ends, wherein a current differential protection device is arranged at each end, characterized by the steps of:
   obtaining, in the current differential protection device at a first end of said protected object, measured values from the current differential protection device at a second end of said protected object,
   comparing, in the current differential protection device at said first end, changes in measured values taken at said first end with changes in said measured values obtained from the current differential protection device at said second end, determining, upon said step of comparing changes in measured values showing differing results, type of fault occurring within said power network.

2. The method as claimed in claim 1, wherein said step of determining type of fault comprises determining occurrence of a primary fault if said step of comparing changes in measurement values shows changes at two or more ends.

3. The method as claimed in claim 2, comprising the further step of tripping a circuit breaker, in response to said step of comparing showing a change in measured values at two or more ends.

4. The method as claimed in claim 1, wherein said step of determining type of fault comprises determining occurrence of a secondary fault if said step of comparing changes in measured values shows changes at only one end.

5. The method as claimed in claim 4, comprising the further step of blocking a tripping command upon said step of determining showing a change in measured values at only one end.

6. The method as claimed in claim 1, comprising the further step of repeating said steps of obtaining and comparing changes in measured values, if said step of comparing shows no changes in measured values.

7. The method as claimed in claim 1, wherein said changes in measured values comprises comparing current changes at said two or more ends.

8. The method as claimed in claim 1, wherein said step of obtaining measured values comprises obtaining numerical values over a fibre-optical connection.

9. The method as claimed in claim 1, wherein said step of comparing changes in measured valued comprises comparing, in the current differential protection device at said first end, changes in synchronized time tagged measured values taken at the first end with changes in said measured values obtained from the current differential protection device at said second end, which measured values are time tagged measured values synchronized to the same clock as the measured values at said first end.

10. The method as claimed in claim 1, wherein said current differential protection devices are connected to said protected object by means of a respective current transformer.

11. The method as claimed in claim 1, wherein said protected device comprises a transmission line.

12. A differential protection system within a power network comprising a protected object having two or more ends, wherein a current differential protection device is arranged at each end, characterized by:

means, in said current differential protection devices, for measuring at each respective end a change of measured values, means, in said current differential protection device, for receiving from the other current differential protection device, measured values, means, in each of said current differential protection device, for comparing changes in measured values taken at said first end to changes in said measured values obtained from said second end, and means, in each of said current differential protection device for determining type of fault occurring within said power network.

13. The differential protection system as claimed in claim 12, wherein said current differential protection devices are connected to said protected object by means of a respective current transformer.

14. A current differential protection device for a power network comprising a protected object having two or more ends, characterized by:

means for measuring a change of measured values, means for obtaining measured values from other end(s) of said protected object, means for comparing changes in measured values taken at said first end to changes in said measured values obtained from said second end, and means for determining type of fault occurring within said power network.

15. The current differential protection device as claimed in claim 14, comprising means for implementing a differential protection method within said power network for determining type of fault occurring within said power network, said power network comprising a protected object having two or more ends, wherein a current differential protection device is arranged at each end, characterized by the steps of obtaining, in the current differential protection device at a first end of said protected object, measured values from the current differential protection device at a second end of said protected object; comparing, in the current differential protection device at said first end, changes in measured values taken at said first end with changes in said measured values obtained from the current differential protection device at said second end; and determining, upon said step of comparing changes in measured values showing differing results, type of fault occurring within said power network.

* * * * *